Jan. 26, 1971   W. W. WHITEHILL ET AL   3,557,454
ENDODONTIC DOWEL AND SLEEVE
Filed Oct. 28, 1968   3 Sheets-Sheet 1
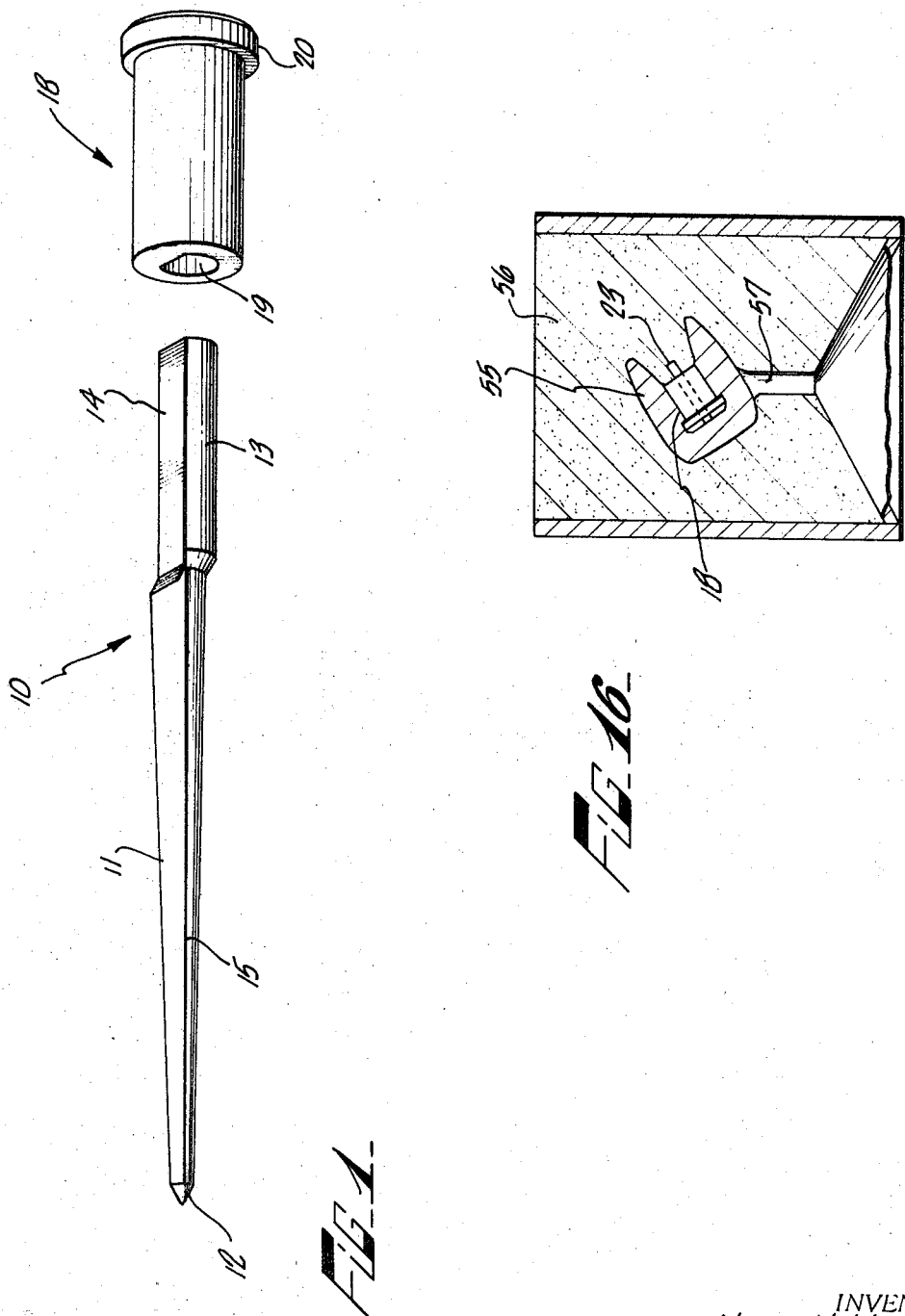
INVENTORS.
WAYNE W. WHITEHILL
LEONARD A. PRESTON
BY
Christie, Parker & Hale
ATTORNEYS

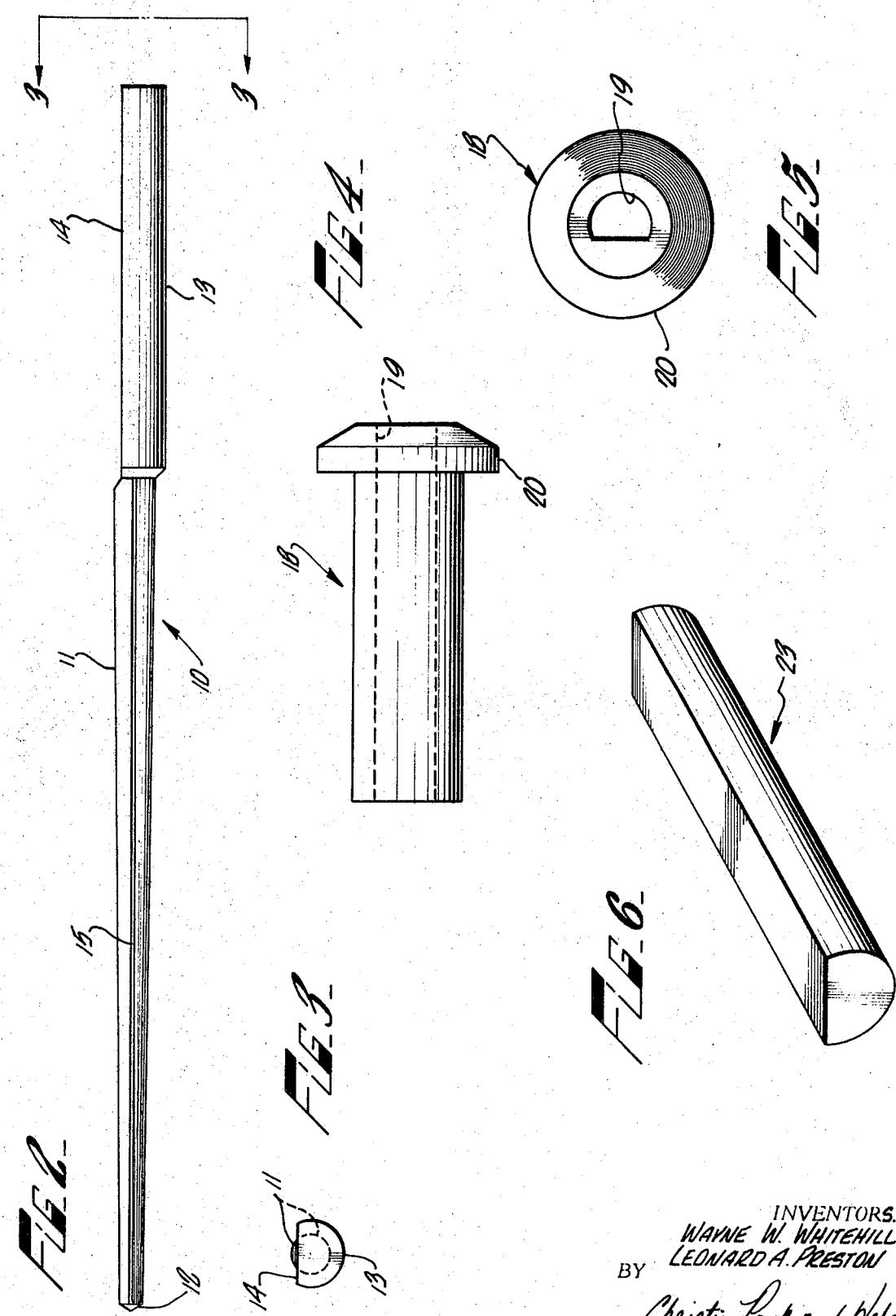

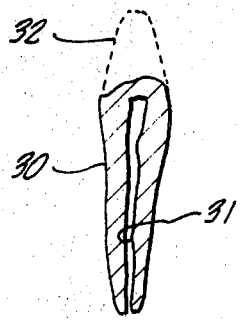
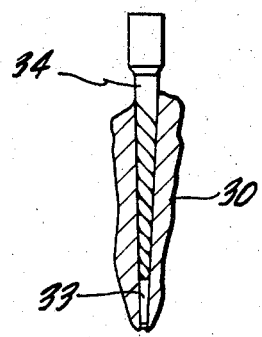
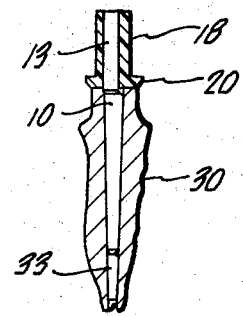
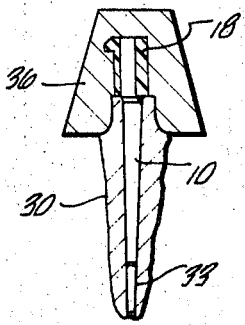
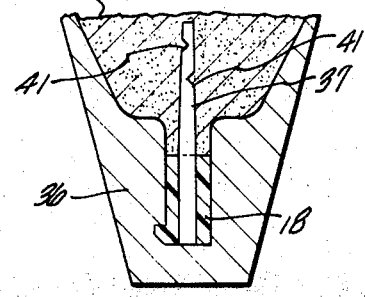
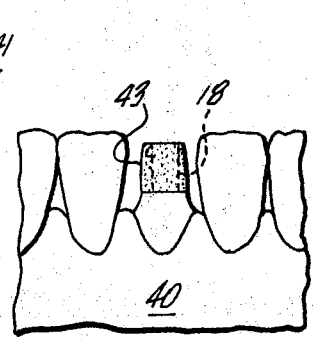
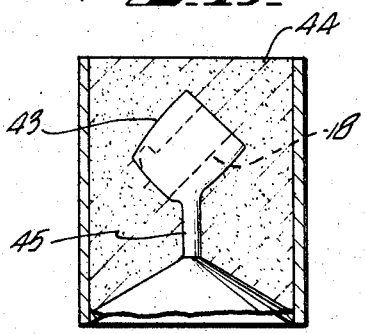
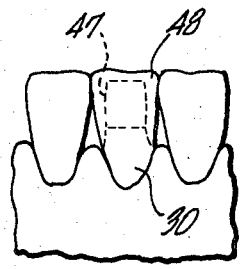
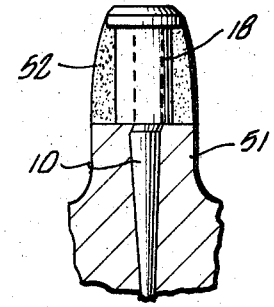

United States Patent Office 3,557,454
Patented Jan. 26, 1971

3,557,454
ENDODONTIC DOWEL AND SLEEVE
Wayne W. Whitehill, Arcadia, and Leonard A. Preston, Duarte, Calif., assignors to Unitek Corporation, Monrovia, Calif., a corporation of California
Filed Oct. 28, 1968, Ser. No. 770,955
Int. Cl. A61c 5/08
U.S. Cl. 32—13                                  6 Claims

ABSTRACT OF THE DISCLOSURE

A dowel and dowel-and-sleeve assembly for forming and anchoring an artificial tooth crown used to restore a diseased or injured natural tooth. The dowel is a unitary pin having a tapered shank and a generally cylindrical head with a flattened side. The dowel is permanently secured in a root canal of the natural tooth immediately after the canal is prepared by removal of pulp material and subsequent enlargement with reamers or files. The sleeve fits snugly and non-rotatively over the dowel head, and has a flanged end which locks the sleeve in a material used to form an image or impression of the damaged tooth. The sleeve is consumed during casting of the artificial crown, and serves to insure a precisely located and dimensioned socket in the crown to receive the dowel.

BACKGROUND OF THE INVENTION

Endodontics is a specialized branch of dentistry dealing with the preservation of injured or diseased teeth by treatment of the pulp or root canal of the tooth. This canal contains bood vessels, a lymphatic system, and nerve supply, and hence encloses a body of soft tissue within the tooth. Treatment of the root-canal region of the tooth is usually done by an endodontist who is equipped with special skills and instruments adapted to the difficult and precise operative steps involved in root-canal treatment.

The endodontist plays a valuable role in the preservation and reconstruction of damaged natural teeth. A general dentist is often faced with badly broken or decayed teeth which lack sufficient crown structure (the crown or coronal portion of a tooth is that part which extends from the gum tissue into the mouth) to support an artificial crown. In the past, a common approach has been to extract the remaining root and neck portion of such a damaged tooth, and thereafter to install an artificial tooth which is secured by bridge members to adjoining natural teeth. The modern approach, however, is to preserve as much natural tooth structure as can possibly be saved, and to anchor an artificial tooth crown to this structure. Every effort is made to maximize the retention of natural structure as the problems associated with prosthetic dental appliances are thereby reduced.

In most badly damaged teeth, the tissue structure in the root canal is no longer viable, and must be removed to avoid infection or decay which can lead to destruction of the remaining portion of the tooth. The general dentist will usually refer his patient to an endodontist for this stage of the treatment. The endodontist removes remaining tissue from the root canal and enlarges the canal using standard tapered files and reamers. The enlarged canal is then ready to accept an elongated and tapered pin or dowel which is eventually rigidly secured in the tooth root. The dowel extends above the remaining tooth root or neck structure to provide an anchor post for an artificial crown. The goal of the process is to provide an artificial-crown anchor or foundation which is very securely attached to and deeply embedded in the remains of the natural tooth. The dowel strengthens the remaining natural structure, as well as providing support for the artificial crown.

When known endodontic dowels and installation techniques are used, the endodontist cleans and reams the root canal, and then temporarily installs a dowel to insure that a proper fit has been achieved. The dowel is removed, and the root canal is packed with a temporary filling material to avoid entry of infection-causing bacteria into the interior of the tooth. The patient is then referred back to the general dentist who makes an impression of the tooth surface in preparation for casting an artificial crown. The crown is cast around the dowel by a dental laboratory, and the crown-and-dowel assembly are cemented to the remaining tooth structure during a subsequent visit of the patient to the general dentist.

This conventional approach has several drawbacks from the standpoint of both dentist and patient. The temporary filling installed in the prepared root canal is essential using conventional techniques, but involve additional chair time for both the endodontist who installs the filling and the general or prosthetic dentist who must remove the filling and reinspect the canal prior to permanent installation of the dowel. Great care must be taken to maintain the root canal in an antiseptic condition during the period after the canal is prepared and until the dowel is permanently installed. The endodontist would prefer to cement the dowel in place permanently immediately after canal preparation is complete. This is not permissible using known techniques, however, because the dowel must have the crown cast over it prior to permanent installation in the tooth being restored. This is due primarily to the need for an extremely accurate fit between the artificial crown and dowel, and conventional impression techniques are inadequate to provide a sufficiently accurate "image" of the dowel to insure the desired fit.

The crown is therefore cast directly over the dowel prior to permanent installation, and the temporary root-canal filling is thus necessary to protect the tooth root during fabrication of the crown. The patient must normally make several visits to the general or prosthetic dentist to have impressions made, and to permit final fitting of the artificial crown. The conventional technique thus involves a number of patient visits and substantial chair time for both dentist and patient, and also requires the installation of a carefully prepared temporary filling which is left in place during the interim period prior to permanent installation of the restoration.

The appliances described herein solve these problems and permit the endodontist to cement the dowel permanently in the root canal immediately after preparation of the canal is complete. Both doctor and patient are thereby relieved of concern about the possibility of root-canal infection while the artificial crown is being prepared, and the installed dowel furthermore provides an immediate anchor for a temporary crown which is installed until the permanent restoration is complete.

Prior to installation of the temporary crown, a plastic sleeve is slipped over the top of the dowel and an impression is taken of the mounted sleeve and the prepared tooth surface. The sleeve has a flange which becomes embedded in the impression material, and the impression material and sleeve are slipped off the dowel as a unit. The sleeve has a precisely contoured socket which makes a snug fit over the dowel, and this socket defines in the impression material a cavity which is precisely reproduced, using conventional investment-casting techniques, in the finished artificial crown.

The somewhat dimensionally unstable impression material is thus not relied on to reproduce the socket configuration as the socket shape is defined directly by the sleeve embedded in the impression material. The finished crown is slipped over and cemented to the head of the installed dowel pin to complete the restoration. The dowel and sleeve of this invention thus permit a considerable reduction in chair time for dentist and patient, and eliminate the need for a temporary filling of the root canal.

SUMMARY OF THE INVENTION

An endodontic dowel according to the invention is formed as an elongated unitary member having a tapered shank and a head extending from the shank. The head has a uniform non-circular cross section along its length. Preferably, the head is formed as a partial cylinder with a flattened side, and a shallow longitudinal venting groove is formed along the shank of the dowel. The dowel is formed of a material suitable for use in the mouth such as stainless steel. The dowel is cemented or otherwise secured in a prepared root canal of a damaged or diseased natural tooth being restored. An expendable sleeve is used in combination with the dowel during construction of a restoration such as an artificial crown used to restore the tooth.

The sleeve has a circular opening or socket with a cross section matching the cross section of the dowel head, and the sleeve makes a snug slip fit over the head. The sleeve has a projection extending laterally therefrom to engage an impression material used to form a stone model of the tooth stump and dowel. Preferably, the sleeve projection is a laterally extending lip at one end of a sleeve, and the sleeve is generally cylindrical. The sleeve is formed of a material such as polystyrene plastic which is adapted to flow when exposed to elevated temperature during investment casting of the artificial crown.

In method terms, the invention includes the step of permanently securing an endodontic dowel to a prepared natural tooth having a root canal which has been cleaned and reamed to a tapered configuration. The dowel has a tapered shank fitted within the root canal, and has a head extending from the tooth. A sleeve is next fitted snugly over the dowel head to be coextensive therewith, the dowel and sleeve being non-rotatable with respect to each other when so assembled. An impression is then taken of the prepared natural tooth with the dowel and sleeve mounted thereon, the sleeve being embedded in and removed with a material forming the impression. An artificial crown is formed by investment-casting techniques, using the sleeve to define a precisely located crown socket configurated to fit the dowel head. The artificial crown is then secured to the dowel and tooth. When a full crown is being cast, an intermediate process includes the steps of inserting a core pin in the sleeve during investment casting of the crown, and subsequently removing the core pin by an acid treatment to form the crown socket.

DESCRIPTION OF THE DRAWINGS

FIG. 1 is a perspective view of a dowel and sleeve according to the invention;

FIG. 2 is a side view of the dowel;

FIG. 3 is an end view of the dowel on line 3—3 of FIG. 2;

FIG. 4 is a side view of the sleeve;

FIG. 5 is an end view of the sleeve;

FIG. 6 is a perspective view of a core pin;

FIG. 7 is a sectional elevation of a damaged tooth to be restored;

FIG. 8 shows the damaged tooth being prepared for installation of the dowel;

FIG. 9 shows the damaged tooth with the dowel installed, and the sleeve in an inverted position on the dowel and tooth;

FIG. 10 is a sectional view showing an impression material formed around the tooth, dowel and sleeve;

FIG. 11 is a sectional view showing the impression material being used as a mold to form a stone model of the prepared tooth;

FIG. 12 shows the finished stone model with a wax coping formed around the sleeve;

FIG. 13 shows the wax coping and sleeve embedded in an investment-casting molding material;

FIG. 14 shows a finished tooth crown installed on the damaged tooth;

FIG. 15 shows a direct method for forming the wax coping on the prepared tooth stump; and FIG. 16 shows an investment-casting mold for forming a full tooth crown.

DESCRIPTION OF THE PREFERRED EMBODIMENT

An endodontic dowel 10 according to the invention is shown in FIGS. 1–3. The dowel is a unitary pin or member formed of a material such as 316L stainless steel. A portion of the dowel defines a shank 11 which tapers uniformly to a conical apical tip 12.

Dowel 10 further has a portion extending integrally from the large-diameter end of the shank to define a head 13 having a non-circular cross section. The head is preferably in the form of a partial cylinder with a flattened side 14. The cross-sectional shape of the head portion of the dowel is uniform throughout its length.

Preferably, a shallow scratch or groove 15 is formed in the side of the dowel along the length of the shank. The dowel is typically available in several different sizes, and is tapered and otherwise dimensioned to match the shape of standard endodontic drills and reamers used in root-canal work. For example, a dowel intended to fit in a root canal prepared with a standard number —50 endodontic reamer has a tapered shank with a long-end diameter of about 0.031 inch, and a small-end diameter of about 0.020 inch. The dowel head is typically about 0.32 inch in length, and 0.051 inch in diameter. The overall length of the dowel is about 1.024 inches.

A sleeve 18 according to the invention is shown in FIGS. 1, 4 and 5. The sleeve is generally cylindrical in shape, and has a central bore defining a socket 19 of a cross section corresponding to the cross section of the dowel head. That is, the sleeve socket is configured to fit snugly and precisely over the partially cylindrical dowel head.

A radially or laterally extending lip 20 extends from one end of the sleeve. The sleeve is formed of a material such as polystyrene plastic which will soften and flow out of an investment material used in forming an artificial crown by investment casting. The sleeve is about 0.094 inch in diameter, 0.315 inch long, and has a lip diameter of about 0.156 inch.

FIG. 6 shows a core pin 23 useful in one casting technique involving the dowel and sleeve of this invention. The core pin is partially cylindrical with a flattened side, and corresponds in cross section to the shape of dowel head 13 so the pin makes a snug slip fit in socket 19 of the sleeve. The core pin is made of a material such as high-purity nickel to be removable from a finished restoration by an acid treatment. The use of the core pin is described in detail below.

The method of using the endodontic dowel and sleeve of this invention will now be described. FIG. 7 shows a natural tooth 30 having a root canol 31. A crown portion 32 (shown in phantom line in FIG. 7) has been lost due to injury or extensive decay of the tooth, and this missing natural crown is to be replaced by an artificial-crown restoration. After preliminary examination of the damaged tooth by a general dentist, the patient is normally referred to an endodontist for preparation of the root canal.

In FIG. 8, the root canal has been opened by the endodontist, and preliminary reaming and cleaning of the root canal is complete. The endodontist may choose to seal the apical end of the root canal with a body 33 of a conventional sealing material such as gutta percha or a sectional silver point. Alternatively, if the root canal is relatively straight, the apical filling can be deleted and the canal prepared for insertion of a dowel along its full length.

A tapered endodontic reamer 34 (FIG. 9) is used to enlarge and taper the root canal in preparation for installation of a dowel. In FIG. 9, a dowel 10 has been installed in the tooth with shank 11 being cemented within the root canal. A conventional dental cement is used to fasten the dowel in place, and groove 15 permits trapped air or excess cement to flow out of the root canal as the dowel is pressed into place. The occlusal end of the tooth is smoothed and contoured as shown in FIG. 9 to accept the restoration.

Referring again to FIG. 9, a sleeve 18 is inverted and slipped over the dowel head such that lip 20 abuts the occlusal end of the prepared tooth. The assembled dowel and sleeve are then inspected to determine if the dowel extends a desired distance from the tooth. Any excess length is removed by grinding or trimming the occlusal end of the dowel and sleeve, care being used to insure that the ends of both the sleeve and dowel remain flush with each other.

The sleeve is then slipped off the dowel and replaced in a normal position in which the sleeve lip is flush with the occlusal end of the dowel as shown in FIG. 10. An impression of the prepared tooth and sleeve is then taken by forming a conventional impression material 36 such as alginate over the prepared tooth and adjoining teeth in the dental arch. The procedure of taking such an impression is conventional, and, for brevity, will not be described in detail.

The impression material is removed from the dental arch, and the sleeve slides off the dowel head and remains embedded in the impression. Lip 20 insures that the sleeve is firmly locked in the impression material. A corner of the lip may be ground away (see FIG. 10) before the impression is taken to provide increased resistance to any external forces which might tend to rotate the sleeve within the impression material.

In FIG. 11, the finished impression and embedded sleeve have inverted, and a temporary dowel 37 is slipped into the sleeve socket. A stone model 40 is then formed of the dental arch by pouring a conventional modeling material into the mold defined by impression material 36. Preferably, several notches 41 are formed in the tapered shank of temporary dowel 37 to insure that the dowel is rigidly anchored within the stone model.

The finished stone model is shown in FIG. 12, and the contours of tooth 30 and the surrounding natural teeth are accurately reproduced in this model. A wax coping 43 is formed around the sleeve, and the coping terminates flush with the occlusal end of the sleeve. The completed coping and embedded sleeve are then slipped off the head of temporary dowel 37, and the coping is sprued in conventional fashion in preparation for investment casting of a finished coping.

The casting operation is shown schematically in FIG. 13 in which an investment material 44 has been packed around the wax coping and embedded sleeve. A sprue 45 extends away from the coping through the investment material. Prior to packing the investment material, socket 19 in the sleeve is open at both ends because the wax coping was terminated at the top of the sleeve. The investment material is therefore able to flow readily into the sleeve socket to fill the interior of the sleeve. The investment material is then heated to melt the wax coping, sprue and sleeve, and these melted materials flow out through the opening formed by the sprue.

A material such as gold from which the final coping is to be made is then poured into the mold cavity defined by investment material 44. This step is typically performed with the aid of a centrifugal casting machine (not shown). When the gold or other coping material has hardened within the mold, the investment material is broken away. The gold sprue is then removed from a resulting cast gold coping 47, and the surface of the coping is finished and polished as desired. The restoration is completed by forming a conventional porcelain jacket crown or veener crown 48 around coping 47.

The investment-casting process discussed above and the techniques of forming the outer jacket of the finished restoration are conventional and need not be described in detail. The finished restoration is shown in FIG. 14 with coping 47 (shown in phantom line) being installed over dowel 10 and against the occlusal end of natural tooth 30. The restoration is secured in place by using a conventional cement.

The process described above is an indirect technique involving fabrication of a stone model of the damaged tooth being restored. This technique is normally used when the damaged tooth is in the posterior part of the dental arch and hence relatively inaccessible to the dentist. If an accessible anterior tooth is being restored, a direct technique may be used in which the intermediate step of forming a stone model is eliminated.

The direct technique is illustrated in FIG. 15 in which a natural tooth 51 having a dowel 10 installed therein has been smoothed and formed to receive an artificial crown. A sleeve 18 is slipped over the dowel head, and a wax coping 52 is formed around the sleeve directly on the natural tooth. The wax coping and the embedded sleeve are then slipped off the dowel head, and an investment casting is made by the same procedure described above. That is, coping 52 corresponds to coping 43 formed by the indirect technique, and the same casting procedures are followed with both copings.

The restorations thus far described have been of the jacket type in which a central coping is surrounded by an outer cap of porcelain or similar material. The dowel and sleeve of this invention, however, are equally useful in forming unitary non-jacketed crowns. If this style of crown is selected by the dentist, a wax model of the full crown is formed around the sleeve when positioned as shown in FIGS. 12 or 15.

A full-crown wax model 55 is shown embedded in an investment material 56 in FIG. 16. A wax sprue 57 extends from the wax crown model. Sleeve 18 is embedded within the wax crown model, and only one end of the sleeve socket is open to receive the investment material. In some cases, it way be difficult to insure that the investment material flows into and completely fills the sleeve socket. Complete filling of the socket is important to insure that the dowel socket in the finished restoration is accurately formed. When a full crown is being cast, a core pin 23 as already described is used to insure accurate formation of the crown socket.

The core pin is inserted in the sleeve socket as shown in FIG. 16 prior to packing the investment material around the wax model and embedded sleeve. Heat is then applied to "burn out" the wax model, sprue and sleeve, and gold or any other conventional material is poured into the resulting mold to form the final crown. After the investment material is broken away, an etchant such as dilute nitric acid is used to dissolve the nickel core pin without attacking the gold restoration. That is, the acid removes the core pin, leaving an accurately formed socket within the gold crown. The gold sprue is removed from the crown, and the crown is installed on the damaged tooth and dowel as described above after being polished and checked for final fit.

There has been described a novel endodontic dowel and seleve which simplify the preparation of cast crowns for restoration of damaged natural teeth. Use of the expendable sleeve permits the dowel to be permanently secured to the natural tooth immediately after preparation of the root canal. The need for a temporary filling is thereby completely eliminated, and one office visit by the patient is often made unnecessary.

The permanently installed dowel is also useful to mount a temporary shell crown (not shown) to permit normal chewing while the permanent crown is being fabricated. If desired, a sleeve of the type described above can be embedded in cement within the shell crown when it is installed. The shell crown can then be removed and replaced one or more times by the general dentist during the several stages of fabricating the permanent crown.

The dowel has been described in terms of one specific application, but can also be used in other types of restorative dentistry. For example, the root canal can be opened through to the supporting bone in the jaw. The dowel is then installed as an endosteal implant with the tapered shank extending through the root into the bone. Similarly, the dowel is useful as an attachment post for anchoring of partial dentures and the like.

What is claimed is:

1. An endodontic dowel-and-sleeve assembly comprising:
   an elongated dowel having a tapered shank and a head extending from the shank, the head having a non-circular cross section; and
   a sleeve having a socket with a cross section matching the cross section of the dowel head whereby the sleeve makes a non-rotative slip fit over the head, the sleeve having a projection extending laterally therefrom to engage an impression material, the sleeve being formed of a material adapted to flow when exposed to elevated temperature in an investment-casting operation.

2. The assembly defined in claim 1 in which the sleeve is formed of a plastic material.

3. The assembly defined in claim 2 in which the sleeve is formed of polystyrene plastic.

4. A method of forming and anchoring an artificial crown to fit on a prepared natural tooth having a root canal which has been cleaned and reamed to a tapered configuration, comprising the steps of:
   permanently securing an endodontic dowel to the tooth, the dowel having a tapered shank fitted within the root canal, and having a head extending from the tooth;
   fitting a sleeve snugly over the dowel head to be coextensive therewith, the dowel and sleeve being non-rotatable with respect to each other when so assembled;
   makig an impression of the prepared natural tooth with the dowel and sleeve mounted thereon, the sleeve being embedded in and removed with a material forming the impression;
   forming an artificial crown by investment-casting techniques using the sleeve to define a precisely located crown socket configured to fit the dowel head; and
   securing the artificial crown to the dowel and tooth.

5. The method defined in claim 4 and further comprising the steps of inserting a core pin in the sleeve during investment casting of the crown, the core pin corresponding in cross-sectional shape to the dowel head, the core pin being embedded in the crown; and subsequently removing the core pin from the crown to form the crown socket.

6. A method of making a dental appliance to fit on a prepared natural tooth having a root canal which has been cleaned and reamed to a tapered configuration, comprising the steps of:
   permanently securing an endodontic dowel to the tooth, the dowel having a tapered shank fitted within the root canal, and having a head extending from the tooth;
   fitting a sleeve snugly over the dowel head to be coextensive therewith, the dowel and sleeve being non-rotatable with respect to each other when so assembled, the sleeve being made of a material which can be removed from an investment-casting mold by application of heat;
   making an impression of the prepared natural tooth with the dowel and sleeve mounted thereon, the sleeve being embedded in and removed with a material forming the impression;
   forming a dental appliance by investment-casting techniques using the sleeve to define a precisely located appliance socket configured to fit the dowel head; and
   securing the appliance to the dowel and tooth.

References Cited
UNITED STATES PATENTS

| | | | |
|---|---|---|---|
| 984,782 | 2/1911 | Starr | 32—13 |
| 2,705,837 | 4/1955 | Gerlach | 32—13 |

ROBERT PESHOCK, Primary Examiner